July 7, 1942.    L. SAIVES    2,289,145
ARRANGEMENT FOR CONTROLLING BRAKES WITH INTERPOSITION OF A SERVO-BRAKE
Filed June 11, 1940
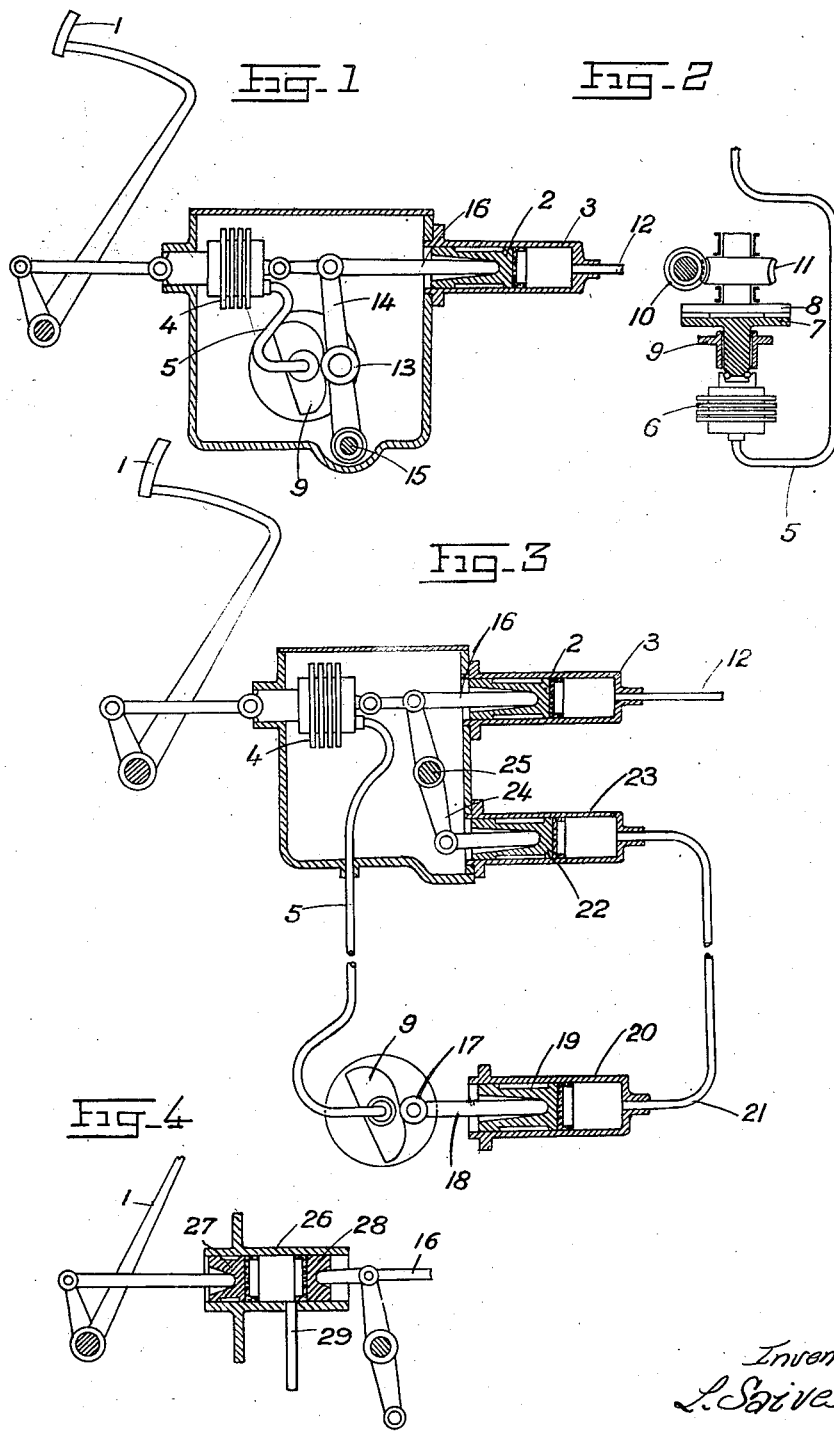

Patented July 7, 1942

2,289,145

UNITED STATES PATENT OFFICE 2,289,145

ARRANGEMENT FOR CONTROLLING BRAKES WITH INTERPOSITION OF A SERVO BRAKE

Leon Saives, Billancourt, France, assignor to Louis Renault, Billancourt, France Application June 11, 1940, Serial No. 339,981
In France June 29, 1939

2 Claims. (Cl. 188—141)

The invention relates to an arrangement for controlling hydraulic brakes for vehicles with the interposition of a mechanical servo-brake, in which the driving member supplying the supplementary braking force, for example a cam, is coupled, under the action of the brake pedal, with a member turning with the wheels of the vehicle. The characteristic feature of the invention resides in the clutch of the servo-motor being actuated by the control of the brakes, through the intermediary of a hydraulic transmission completely independent of the hydraulic transmission controlling the brakes of the various wheels. The supplementary force supplied by the servo-motor is transmitted to the arrangement controlling the brakes, either mechanically or by another hydraulic transmission independent of that of the brakes.

Two constructions of the invention are shown, by way of example, in the accompanying drawing, in which:

Figure 1 is a diagrammatic view of a control arrangement according to the invention, with mechanical transmission of the supplementary force of the servo-motor.

Figure 2 is a corresponding sectional view of the servo-motor.

Figure 3 is a view similar to that of Figure 1, but with hydraulic transmission of the complementary force of the servo-motor.

Figure 4 shows a modification of one of the parts of the control arrangement.

The brake pedal 1 controls the piston 2 of the master cylinder 3, through the intermediary of a cylinder or casing 4 containing a liquid which is placed under pressure by the force exerted on the pedal. This liquid transmits, through the intermediary of a conduit 5 and of a cylinder or casing 6 (Figure 2), a force which produces the interengagement of the discs 7—8 of the servo-brake and the driving of the cam 9 under the action of the gears 10—11, which turn with the wheels of the vehicle. The master cylinder 3 is connected to the brakes of the wheels by a conduit 12.

In the constructional form shown in Figure 1, the cam 9, through a roller 13, exerts a thrust on the lever 14 articulated at a fixed point 15, and this lever 14, which is coupled with the rod 16, which connects the casing 4 to the piston 2, exerts a force which supplements that of the pedal on the piston 2.

In the embodiment shown in Figure 3, the cam 9 exerts, through the roller 17 and the rod 18, a force on the piston 19 of the cylinder 20 which communicates through a conduit 21 with a cylinder 23 disposed in the neighborhood of the cylinder 3. The piston 22 of this cylinder 23 thus transmits, on braking during travel, an effort to the lever 24 articulated at the fixed point 25 and coupled, like the lever 14 of Figure 1, with the rod 16 which connects the casing 4 to the piston 2. The force thus transmitted is added to that of the pedal 1. This arrangement as shown in Figure 3 in which the cam 9 is not mechanically connected direct to the rod 16 permits of giving the servo-motor operating the cam 9 a position remote to that of the control arrangement 2—4, the necessary connections being established by the conduits 5 and 21.

It is to be noted that when a casing 4 is employed between the pedal 1 and the master cylinder 3, this casing 4 moves in accordance with the movement of the pedal 1 and of the piston 2 of the master cylinder. It must therefore be connected to the casing 6 by a conduit having at least one flexible part. In order to avoid the use of a flexible tube, the casing 4 may be replaced by a cylinder 26 (Figure 4) provided with two pistons 27 and 28 which are connected respectively to the pedal 1 and to the piston 2 of the master cylinder 3. The space between these two pistons is then sufficient to be in constant communication with a rigid tube 29 substituted for the conduit 5.

I claim:

1. In a hydraulic brake system, a brake pedal, a cylinder, a piston movable in said cylinder for providing brake applying pressure, an operating connection between said pedal and said piston, a power driven member, pressure responsive means for establishing a driving connection between said power driven member and said operating connection, and means interposed in said operating connection for variably applying pressure to the pressure responsive means in dependence upon operation of said pedal.

2. In a hydraulic brake system, a brake pedal, a cylinder, a piston movable in said cylinder for providing brake applying pressure, an operating connection between said pedal and said piston, a power driven member, and means controlled by said pedal for establishing a driving connection between said power driven member and said operating connection, said means being constituted by hydraulic means.

LEON SAIVES.